United States Patent [19]

Athas

[11] Patent Number: 5,388,241
[45] Date of Patent: Feb. 7, 1995

[54] ASYNCHRONOUS CIRCUIT FOR 2-CYCLE TO 4-CYCLE HANDSHAKE CONVERSION

[75] Inventor: William C. Athas, Redondo Beach, Calif.

[73] Assignee: Northrop Grumman Corporation, Los Angeles, Calif.

[21] Appl. No.: 850,322

[22] Filed: Mar. 10, 1992

[51] Int. Cl.6 ............................................. G06F 13/42
[52] U.S. Cl. ........................... 395/500; 364/DIG. 2; 364/934; 327/141
[58] Field of Search ............... 364/DIG. 1 MS File, 364/DIG. 2 MS File; 328/37, 63, 15, 72; 307/260, 269; 395/209, 250, 325, 500, 550, 800

[56] References Cited

U.S. PATENT DOCUMENTS

| | | | |
|---|---|---|---|
| 3,950,705 | 4/1976 | Fuerherm | 328/108 |
| 4,070,630 | 1/1978 | Hepworth et al. | 328/63 |
| 4,845,437 | 7/1989 | Mansur et al. | 328/15 |
| 4,855,615 | 8/1989 | Humpleman | 307/269 |

Primary Examiner—Robert B. Harrell
Attorney, Agent, or Firm—Terry J. Anderson; Karl J. Hoch, Jr.

[57] ABSTRACT

A two- to four-cycle handshake protocol conversion circuit suitable for on-chip implementation uses an exclusive-OR Gate and an AND Gate with one inverted input together with a latching circuit to generate the two-cycle handshake protocol acknowledge signal, A2, as a clocked version of the two-cycle handshake protocol request signal, R2, using the rising edge of the four-cycle handshake protocol acknowledge signal, A4, as the clocking input. The four-cycle handshake protocol request signal R4 is provided as the ANDed output of the complement of A4 combined with the output of the exclusive-OR Gate, the inputs of which are provided by R2 and A2. The latching network may be provided by a simple D flip-flop.

10 Claims, 1 Drawing Sheet

ASYNCHRONOUS CIRCUIT FOR 2-CYCLE TO 4-CYCLE HANDSHAKE CONVERSION

BACKGROUND OF THE INVENTION

1. Field of the Invention

This invention relates to the field of integrated circuits and, in particular, to on-chip techniques for asynchronously converting between an asynchronous four-cycle handshaking protocol typically used for on-chip circuits and an asynchronous two-cycle handshaking protocol often used for off-chip signaling.

2. Description of the Prior Art

Conventional very large scale integration—or VLSI—integrated circuit chips, such as MOS and bipolar VLSI chips, often contain hundreds or thousands of on-chip electronic subsystems for performing electronic tasks. The input and output —or I/O—connections between such on-chip circuits and off-chip electronic signals are made via on-chip I/O pads, usually positioned around the periphery of the active circuitry on the chip substrate.

The performance of conventional VLSI chips is often limited by the switching speeds of such I/O pads. One technique for improving performance of these I/O connections is to conserve off-chip I/O bandwidth by converting between transition inefficient handshaking protocols used by on-chip circuits and the transition efficient handshaking protocols used for off-chip signaling.

Handshaking protocols are communication control techniques used to control the transfer of information between circuits. Such protocols typically use a pair of signals, called request and acknowledge signals, to provide a controlled communication path between circuits or subsystems so that the subsystem providing the information initiates the data transfer cycle and only the subsystem designated to receive the information indicates data transfer completion. That is, the circuit wishing to transmit data first sends a request signal and the circuit receiving the data indicates that it has received the data by sending an acknowledge signal.

The two handshaking protocols of primary current concern with respect to MOS and bipolar VLSI chips are the on-chip four-cycle handshaking protocol and the off-chip two-cycle handshaking protocol. The terms "two-cycle" and "four-cycle" refer to the number of logic state or signal transitions that occur between the initial transition of the request signal and the final transition of the acknowledge signal. These signals are said to be asserted, for example, only when they change from a logic zero state to a logic one state and are said to be negated when the transition goes from a logic one to a logic zero state.

The on-chip electronic subsystems, such as logic gate arrays, can be self-timed or asynchronous designs in which the timing of the flow of logic signals from gate to gate is not externally controlled by clock or timing pulses, but rather by the logic signals themselves. Such self-timed circuits often use four-cycle handshaking protocols because of the restorative and return-to-zero properties of this handshaking protocol.

Off-chip electronic systems, such as an interconnection between on-chip electronic subsystems on two separate chips, typically use two-cycle handshaking protocols because twice the data can be transferred using the same number of control signal transitions.

SUMMARY OF THE INVENTION

The preceding and other shortcomings of the prior art are addressed and overcome by the present invention in which, in a first aspect, provides a handshake protocol conversion circuit for performing conversion between two-cycle handshake request and acknowledge signals R2 and A2 and four-cycle handshake request and acknowledge signals R4 and A4, means for storing the binary value of R2, means for controlling the binary value of R4 to be a first binary value if R2 and A2 have the same binary values or A4 has a second binary value and for controlling the value of R4 to be the second binary value if R2 and A2 have different values and A4 has the first binary value, and means for setting A2 equal to the stored binary value of R2 when A4 is asserted.

In a further aspect, the present invention provides a method for performing protocol conversion between two-cycle handshake request and acknowledge signals R2 and A2 and four-cycle handshake request and acknowledge signals R4 and A4 by storing the binary value of R2, controlling the binary value of R4 to be a first binary value if the binary values of A2 and R2 are equal or the binary value of A4 is a second binary value, controlling the binary value of R4 to be the second binary value if the binary values of A2 and R2 are not equal and the binary value of A4 is the first binary value; and setting the binary value of A2 equal to the stored binary value of R2 when A4 is asserted.

These and other features and advantages of this invention will become further apparent from the detailed description that follows which is accompanied by drawing figures. In the figures and description, numerals indicate the various features of the invention, like numerals referring to like features throughout both the figures and the description.

DETAILED DESCRIPTION OF THE PREFERRED EMBODIMENT(S)

As will be shown in the following step-by-step analysis of on-chip protocol conversion circuit 10 in FIGS. 1 and 2, the signals in the two- and four-cycle handshake protocols are first initialized so that all signals are assumed to be low and then A2 is made equal to R2 when A4 is asserted. In other words, A2 is generated as a clocked version of R2 using A4 as the clock. Latching network 16 is used to store the last state of R2 so that A2 may be asserted and negated on assertions of A4. This technique permits a convenient protocol conversion from two- to four-cycle handshake protocols suitable for on-chip implementation for a plurality of on-chip signal paths.

Figure 1:
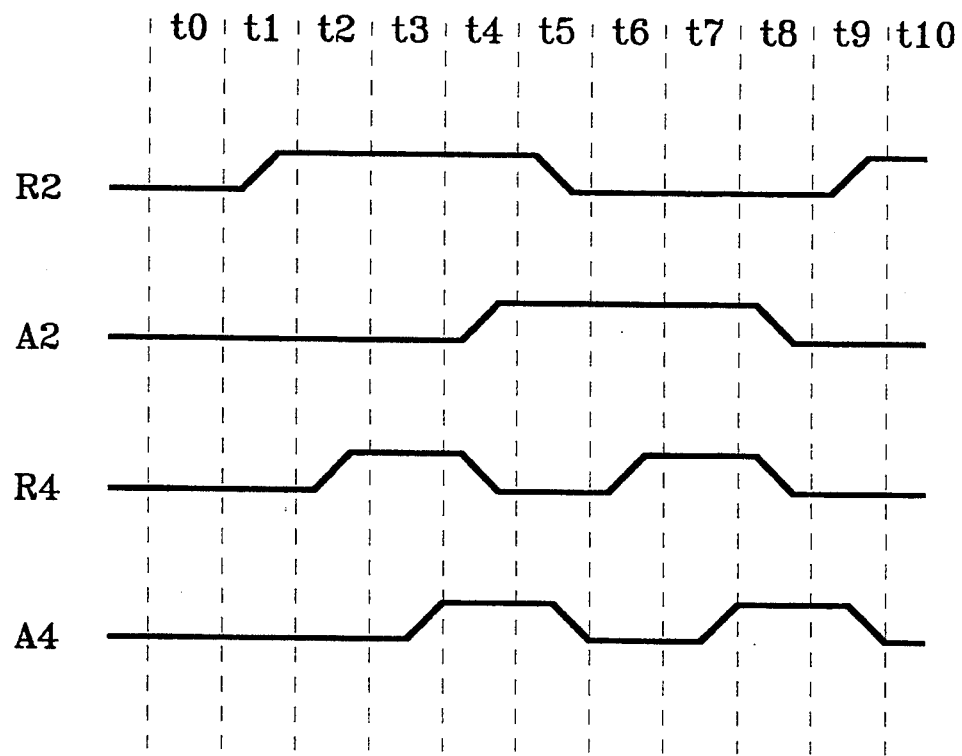
FIG. 1 is a timing graph showing the request and acknowledge signals of two and four-cycle handshaking protocol signals which have been converted using the present invention.

In particular, FIG. 1 is a timing graph showing the request and acknowledge signals of two- and four-cycle handshaking protocol signals which have been converted using the present invention. R2 and A2 are the request and acknowledge signals of a two-cycle handshaking protocol such as may be used for off-chip signal interchange. R4 and A4 are the request and acknowledge signals of a four-cycle handshaking protocol such as may be used for on-chip signal interchange.

In two-cycle handshaking protocols, data transfer is complete after the acknowledge signal has been asserted in response to the assertion of the request signal or after the acknowledge signal has been negated after the negation of the request signal. For example, the assertion of R2 during time period t1 indicates that data is available for transfer and the subsequent assertion of A2 in time period t4 indicates that the data transfer, as well as the data transfer cycle, has been completed. Similarly, the negation of R2 in time period t5 indicates that data is available for transfer and the subsequent negation of A2 in time period t8 indicates that the data transfer cycle has been completed. Every transition of R2, either assertion or negation, initiates a data transfer cycle while every transition of A2, either assertion or negation, indicates the completion of a data transfer cycle.

A two-cycle handshake protocol is called a Not-Return-to-Zero or NRTZ protocol because the request and acknowledge signals do not return to the low state after the completion of every data transfer cycle but rather return to the low state after the completion of every other data transfer cycle. A four-cycle handshaking protocol is called a return-to-zero or RTZ protocol because the request and acknowledge signals always return to the low state after the completion of a data transfer cycle and before the beginning of the next data transfer cycle.

In four-cycle handshaking protocols, data transfer is complete only after the negation of the acknowledge signal which must follow the negation of the request signal. For example, the assertion of R4 during time period t2 indicates that data is available for transfer and the subsequent assertion of A4 in time period t3 indicates that the data has been transferred, but does not indicate that the data transfer cycle has been completed. After the assertion of A4 in time period t3, the subsequent negation of R4 in time period t4 sets the request signal low and then the subsequent negation of A4 in time period t5 indicates completion of the data transfer cycle. Every assertion of R4 therefore initiates a data transfer cycle while every negation of A4 indicates the completion of a data transfer cycle. Therefore only every other transition of R4, and in particular the upward going transitions called assertions, initiates a data transfer while only every other transition of A4, and in particular only the downward going transitions called negations, indicates the completion of a data transfer cycle.

In the above example, assertion of the request and acknowledge signals was indicated to be on the positive or upward going edge, that is, when the signal changed from the low or binary zero state to the high or binary one state. Of course, in particular systems, the first assertion may be in the opposite direction, that is, on the negative going edge when the signal changes from the high or binary one state to the low or binary zero state. For the purposes of the following description, it will be assumed for convenience that the first assertion will be on the positive going edge.

In the two-cycle handshake protocol, the transition of R2 required to initiate a data transfer is not required to be in the same direction as the transition that initiated the previous data transfer. It must in fact be a transition going in the opposite direction. In particular, if the transition of R2 which initiated a data transfer was an assertion, that is, the positive going edge of a signal transition as shown in time period t1, the next data cycle will be initiated by a negation of R2, that is, a negative going edge of a signal transition as shown in time period t5. The third data cycle is then initiated by the assertion of R2 in time period t9.

In the four-cycle handshake protocol, the transition of required to initiate a data transfer is an assertion and is therefore always going to be in the same direction as the transition that initiated the previous data cycle because that cycle must also have been initiated by an assertion of R4. Similarly, the transition of A4 which indicates the completion of a data transfer cycle must be a negation of A4. In particular, data transfer cycles are initiated by assertions of R4 as shown in time periods t2 and t4 while the completion of data transfer cycles are indicated by the negations of A4 shown in time periods t5 and t6.

Data must be transferred between a circuit using the two-cycle handshake protocol, and a circuit using the four-cycle handshake protocol, after the transitions of R2 and R4 initiating a data transfer cycle and before the transitions of A4 and A2 that indicate the completion of a data transfer cycle. In particular, data is transferred between circuits represented by the handshake protocols shown in FIG. 1 after the initiation of the data transfer cycle by the assertion of R2 in time period t1 and the assertion of R4 in time period t2 and before the acknowledgement that data transfer was completed by the assertion of A4 in time period t3 and the completion of the data transfer cycle indicated by the assertion of A2 in time period t4 and the negation of A4 time period t5. The data transfer therefore occurs at about the time of transition between time periods t2 and t3. In the second data transfer cycle depicted in FIG. 1, data is transferred after the initiation of the second data transfer cycle by the negation R2 in time period t5 and the assertion of R4 in time period t6 and before the acknowledgement that data transfer was completed by the assertion of A4 in time period t7 and the completion of the data transfer cycle indicated by the negation of A2 in time period t4 and the negation of A4 in time period t9. The data transfer must therefore occur at about the time of transition between time periods t6 and t7.

Figure 2:
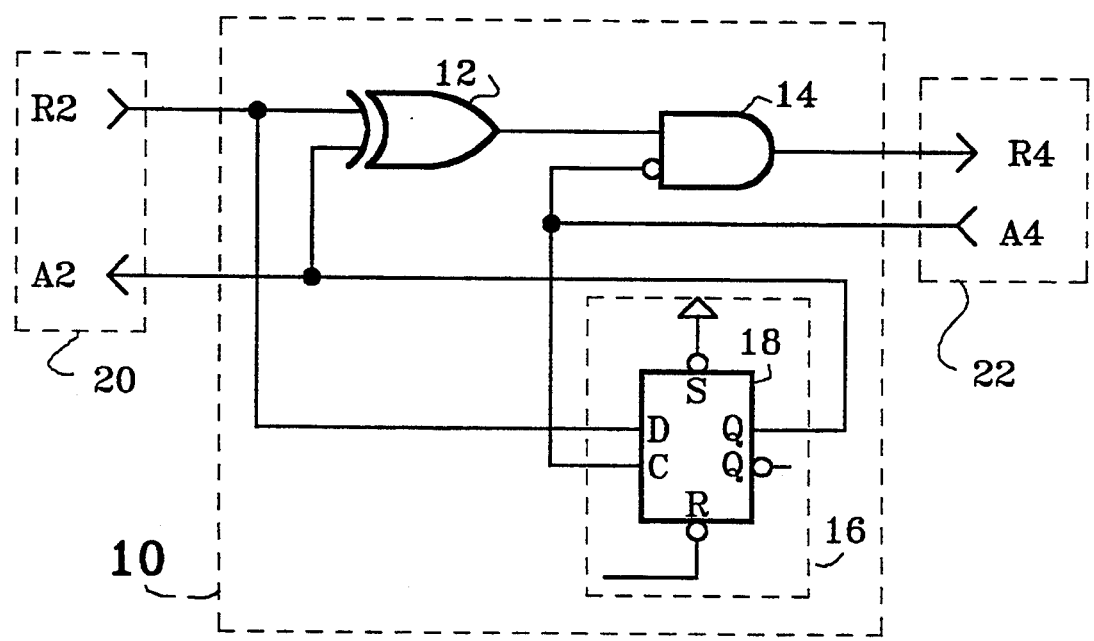
FIG. 2 is a schematic diagram of a logic circuit for implementing protocol conversion between two-cycle and 4-cycle handshaking protocols in accordance with the present invention.

Referring now to FIG. 2, the two-cycle handshake protocol utilized by off-chip circuit 20 may be converted to the four-cycle handshake protocol utilized by on-chip circuit 22 by on-chip protocol conversion circuit 10 in accordance with the present invention. On-chip circuit 22 and on-chip protocol conversion circuit 10 may conveniently be co-located on the same integrated circuit chip while off-chip circuit 20 may be located on another chip or any other required off-chip location.

All protocol signals are assumed for convenience to begin in an initialized state at a binary zero or low state at time period t0. When off-chip circuit 20 desires to provide data to on-chip circuit 22, on-chip protocol conversion circuit 10 is utilized and receives R2, asserted by off-chip circuit 20 as shown in time period t1.

R2 is applied to on-chip protocol conversion circuit 10 as one input to exclusive-OR Gate 12 and also as one input to latching network 16. Latching network 16 is shown in FIG. 2 as clocked D-type flip-flop 18, but may be implemented in various other conventionally known configurations providing the equivalent truth table of inputs and outputs. In the configuration shown, R2 is applied as the "D" input of D flip-flop 18, the "C" or clock input of which is provided by A4. As noted above, in the initialized state at time period t0, A4 is assumed to be low or binary zero.

The output of latching network 16 is the "Q" output of D flip-flop 18 which is used as A2. As noted above, at time period t0, all signals are assumed to be binary zero so that both A4 and R2 are zero. The output of D flip-flop 18, A2, is also zero and is applied as the second input to exclusive-OR Gate 12. At time period t0, both inputs of exclusive-OR Gate 12 are therefore binary zero so that the output thereof is also low. The output of exclusive-OR Gate 12 is combined in AND Gate 14 with the complement of A4 so that the output of AND Gate 14, which is used as R4, is low at time period t0.

When R2 is asserted at time period t1, the output of latching network 16 is not changed because A4 remains low and a clock input has not therefore been applied to D flip-flop 18. However, since R2 is now high, the output of exclusive-OR Gate 12 goes high, applying a binary one or high input to AND Gate 14. Now that both inputs of AND Gate 14 are high, that is, the high output of exclusive-OR Gate 12 and the complement of the low A4, the output of AND Gate 14 then goes high as shown in time period t2, asserting R4 as a result of the assertion of R2.

In this manner, it can be seen that the assertion of R2 results in the assertion of R4 successfully providing the appropriate protocol conversion for the request signal from the two-cycle to the four-cycle handshake protocol.

After R4 has been asserted, the data is transferred and the appropriate data transfer acknowledge signal, A4, is asserted by on-chip circuit 22 as shown in FIG. 1 in time period t3. As noted above, A4 is applied as the clock input to D flip-flop 18 in latching network 16. R2, as also noted above, is high and has already been applied to the D input of D flip-flop 18 so that when A4 is asserted, A2—which is the Q output of D flip-flop 18 —is also then asserted because D flip-flop 18 is toggled from low to high.

In addition, the assertion of A4 in time period t3 also changes the inverted input of AND Gate 14 from low to high. The output of AND Gate 14, R4, is then driven low as shown in time period t4.

The assertion of A2 in time period t4 means that both inputs to exclusive-OR Gate 12 go high so that the output of exclusive-OR Gate 12 goes low. The output of AND Gate 14 has already been set low and now will remain low because both inputs are low.

After A2 has been asserted and applied to off-chip circuit 20, two-cycle handshake protocol request signal R2 may be negated by off-chip circuit 20 as shown in FIG. 1 in time period t5 initiating the next data transfer cycle. Similarly, the negation of R4 in time period t4 results in negation of A4 in time period t5 by on-chip circuit 22.

The negation of A4 by on-chip circuit 22 in time period t5 causes A4 to go low. Because D flip-flop 18 is clocked on a positive going edge, this negation of A4 in time period t5 does not affect the output of D flip-flop 18 nor, therefore, latching network 16. The complement of A4 is applied to AND Gate 14 but R4, the output of AND Gate 14, remains low because the input thereto from exclusive-OR Gate 12 remains low. Off-chip circuit 20 is then permitted to negate R2 because A2 is high. The negation of R2 in time period t5 causes the assertion of R4 in time period t6 because of the change in the inputs to exclusive-OR Gate 12. AND Gate 14 goes high in response to the change in the output of exclusive-OR Gate 12.

The assertion of the R4 four-cycle handshake protocol request signal in time period t6 is applied to on-chip circuit 22, causing the generation of the appropriate acknowledge signal, A4, by on-chip circuit 22 in time period t7. This assertion of A4 is an upward going edge, so that in addition to resetting R4 in time period t8 via AND Gate 14, this upward going assertion of A4 applied to the "C" or clock input of D flip-flop 18 causes the output of latching network 16 to toggle and therefore resets A2 as also shown in time period t8.

The negation of R4 in time period t8 via the output of AND Gate 14 when applied to on-chip circuit 22 results in the negation of A4 by on-chip circuit 22 as shown in time period t9. This negation of A4 does not change the output of latching network 16. The reassertion of R2 by off-chip circuit 20 in time period t9 begins the data transfer cycle again.

Latching network 16 is shown in FIG. 2 as implemented in the form of D flip-flop 18, but other circuits may be used for storing the last state of R2 and asserting A2 on assertions of A4. For example, while D flip-flop 18 is an edge-sensitive device, a level sensitive latch may be more suitable for CMOS implementation. A sample and hold circuit may be used to sample R2 when A4 is high and to hold that value when A4 is low. However, to insure that the sampling period for the latch is of sufficient duration, A4 must have a minimum pulse width which would be implementation specific. A delay line between A4 and the input of AND Gate 14 may be required.

While this invention has been described with reference to its presently preferred embodiment(s), its scope is not limited thereto. Rather, such scope is only limited insofar as defined by the following set of claims and all equivalents thereof.

What is claimed is:

1. A handshake protocol conversion circuit for performing conversion between two-cycle handshake request and acknowledge signals R2 and A2, respectively, and four-cycle handshake request and acknowledge signals R4 and A4, respectively, comprising:
   means for storing a binary value of R2;
   means for controlling a binary value of R4 to be
   a first binary value when the binary value of R2 and a binary value of A2 are the same binary value,
   the first binary value when a binary value of A4 is a second binary value different from the first binary value, and
   the second binary value when the binary values of R2 and A2 are different binary values and the binary value of A4 is the first binary value; and
   means for setting the binary value of A2 equal to the stored binary value of R2 in response to an assertion of A4.

2. The handshake protocol conversion circuit claimed in claim 1 wherein the means for storing the binary value of R2 comprises:
   means for storing the binary value of R2 in response to the assertion of A4.

3. The handshake protocol conversion circuit claimed in claim 2 wherein the means for setting the binary value of A2 comprises:

means for setting the binary value of A2 equal to the stored binary value of R2 in response to the assertion of A4.

4. The handshake protocol conversion circuit claimed in claim 3 wherein the means for setting the binary value of A2 comprises:
   a clocked D flip-flop wherein R2 is applied as a D signal input, A4 is applied as a clock input, and A2 is a Q output signal.

5. The handshake protocol conversion circuit claimed in claim 4 wherein the means for setting the binary value of R4 comprises:
   an exclusive-OR Gate receiving R2 and A2 as inputs; and
   an AND Gate receiving an output of the exclusive-OR Gate as a first input and a binary complement of the binary value of A4 as a second input.

6. A method for performing protocol conversion between two-cycle handshake request and acknowledge signals R2 and A2, respectively, and four-cycle handshake request and acknowledge signals R4 and A4, respectively, comprising the sequential steps of:
   storing a binary value of R2;
   controlling a binary value of R4 to be
      a first binary value when a binary value of A2 and the binary value of R2 are equal,
      the first binary value when a binary value of A4 is a second binary value different from the first binary value, and
      the second binary value when the binary values of A2 and R2 are not equal and the binary value of A4 is the first binary value; and
   setting the binary value of A2 equal to the stored binary value of R2 in response to an assertion of A4.

7. The method for performing protocol conversion claimed in claim 6 wherein the step of storing the binary value of R2 comprises storing the binary value of R2 in response to the assertion of A4.

8. The method for performing protocol conversion claimed in claim 7 wherein:
   the step of storing the binary value of R2 comprises storing the binary value of R2 in a clocked flip-flop as a D signal input; and
   the step of setting the binary value of A2 comprises the sequential steps of
      applying A4 to a clocked input of the clocked flip-flop, and
      setting the binary value of A2 in accordance with an output of the clocked flip-flop.

9. The method for performing protocol conversion claimed in claim 8 wherein the step of controlling the binary value of R4 comprises the sequential steps of:
   deriving an exclusive OR value of the binary values of R2 and A2; and
   setting the binary value of R4 as an AND value of the derived exclusive OR value and a complementary value of the binary value of A4.

10. A handshake protocol conversion circuit for performing conversion between two-cycle handshake request and acknowledge signals R2 and A2, respectively, and four-cycle handshake request and acknowledge signals R4 and A4, respectively, comprising:
   a clocked D flip-flop wherein R2 is applied as a D signal input, A4 is applied as a clock input, and A2 is a Q output signal;
   an exclusive-OR Gate wherein R2 and A2 are received as inputs; and,
   an AND Gate wherein an output of the exclusive-OR Gate is received as a first input, a binary complement of A4 is received as a second input, and R4 is output as a gate output signal.

* * * * *